(12) United States Patent
Hemmer et al.

(10) Patent No.: US 6,646,096 B2
(45) Date of Patent: Nov. 11, 2003

(54) METHOD FOR CONTROLLING THE MANUFACTURE OF POLYCARBONATE AND THE POLYCARBONATE FORMED THEREBY

(75) Inventors: Gregory Lee Hemmer, Evansville, IN (US); Jon Bruce Mansfield, Montgomery, AL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/683,017

(22) Filed: Nov. 8, 2001

(65) Prior Publication Data

US 2002/0111455 A1 Aug. 15, 2002

Related U.S. Application Data

(60) Provisional application No. 60/253,906, filed on Nov. 29, 2000.

(51) Int. Cl.$^7$ ................................................ C08G 64/00
(52) U.S. Cl. .......................... 528/196; 528/198; 526/59
(58) Field of Search ................................ 528/196, 198; 526/59

(56) References Cited

U.S. PATENT DOCUMENTS

| | | | | | |
|---|---|---|---|---|---|
| 3,635,895 A | * | 1/1972 | Kramer et al. | ............... | 525/462 |
| 4,001,184 A | * | 1/1977 | Scott | ........................... | 528/126 |
| 4,217,438 A | * | 8/1980 | Brunelle et al. | ............. | 525/462 |
| 5,114,861 A | * | 5/1992 | Silva et al. | ................... | 436/171 |
| 5,586,051 A | * | 12/1996 | Miranda et al. | ............... | 23/306 |
| 6,392,079 B1 | * | 5/2002 | Silva et al. | ................... | 558/282 |

FOREIGN PATENT DOCUMENTS

GB       1 409 614       10/1975

OTHER PUBLICATIONS

PCT International Search Report for International Application No. PCT/US 01/43321; International Filing Date Nov. 21, 2001.

\* cited by examiner

*Primary Examiner*—Terressa M. Boykin

(57) ABSTRACT

A method for determining the endpoint of an interfacial reaction between a dihydroxy compound and a carbonyl halide comprises determining the characteristic end point of the reaction from a characteristic pH trace over time or ratio between caustic and carbonyl halide trace over time for the reaction; obtaining a pH trace over time or a ratio between caustic and carbonyl halide trace over time during the reaction to be monitored; and identifying the end point of the monitored reaction when the obtained pH or ratio trace resembles the end point determined from the characteristic pH or ratio trace.

16 Claims, 1 Drawing Sheet

Key:
Purple: pH
Red: Ratio
Blue: Phosgene flow

US 6,646,096 B2

METHOD FOR CONTROLLING THE MANUFACTURE OF POLYCARBONATE AND THE POLYCARBONATE FORMED THEREBY

CROSS REFERENCE TO RELATED APPLICATIONS

This application claims priority to U.S. Provisional Application Ser. No. 60/253,906 filed on Nov. 29, 2000, which is incorporated herein by reference in its entirety.

BACKGROUND OF INVENTION

Polycarbonates are prepared on an industrial scale by the interfacial reaction of dihydroxy compounds with a carbonyl halide in the presence of a base. The majority of these processes are either batch processes, or "batch flow" systems wherein all reactants other than gases are added to the reaction batch-wise, while gases are provided continuously throughout the reaction.

Present technology requires that every batch in the process be periodically sampled and analyzed to determine when satisfactory batch completion has taken place. This may be done by measuring the amount of free bisphenol present in the organic phase, or by determining the molecular weight of the polycarbonate resin product. The amount of free bisphenol may be quickly determined, but no acceptably fast analysis method is presently available to determine the molecular weight of the product. The lack of adequate testing methods results in loss of production time, excessive use of reagents to ensure that molecular weight build is complete, and exposure of personnel to low boiling point solvents.

Other methods have been developed to determine the completion of batch-wise polycarbonate reactions. U.S. Pat. No. 5,114,861 discloses a method for detecting the endpoint of an interfacial aromatic polycarbonate polymerization reaction comprising illuminating a sample of the polymerization reaction mixture with a light source and monitoring the extent of apparent light scattering of the sample throughout the course of the polycondensation reaction until, at the endpoint, a predetermined threshold extent of apparent light scattering is achieved. As with those previously described, this method requires periodic sampling, which results in loss of production time.

SUMMARY OF INVENTION

A method for determining the endpoint of an interfacial reaction between a dihydroxy compound and a carbonyl halide comprises determining the characteristic end point of the react on from a characteristic pH trace over time or ratio between caustic and carbonyl halide trace over time for the reaction; obtaining a pH trace over time or a ratio between caustic and carbonyl halide trace over time during the reaction to be monitored; and identifying the end point of he monitored reaction when the obtained pH or ratio trace resembles the end point determined from the characteristic pH or ratio trace.

The above described and other features are exemplified by the following figures and detailed description.

BRIEF DESCRIPTION OF DRAWINGS

Referring now to the figures wherein the like elements are numbered alike.

DETAILED DESCRIPTION

Figure 1:
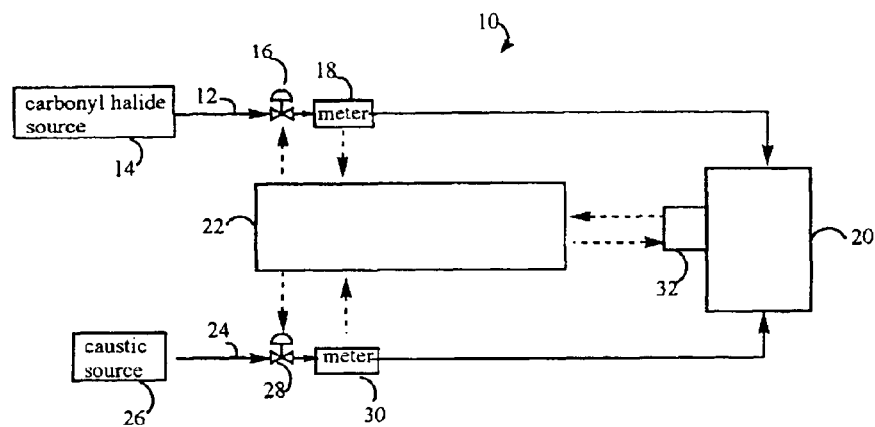
FIG. 1 is a schematic view of the advanced control scheme for a batch-wise polycarbonate resin reactor.

The method involves the manipulation of a control scheme for operating, controlling, monitoring and diagnosing various parameters and processes of polycarbonate batch-wise reactions, resulting in the accurate determination of batch completion for successive reactions. In particular, the control scheme allows for the monitoring of pH and the production of a pH trace for an interfacial polycarbonate batch-wise reactor process. The pH trace can be correlated against the ratio of reactants charged, thereby allowing for the determination of reaction completion without periodic sampling of the reaction.

The method for the manipulation of a control scheme is useful for the manufacture of a wide variety of polycarbonates and polycarbonate compositions. As used herein, the terms "polycarbonate" and "polycarbonate composition" includes compositions having structural units of the formula (I):

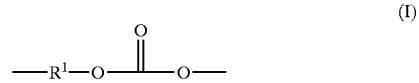

in which at least about 60 percent of the total number of $R^1$ groups are aromatic organic radicals and the balance thereof are aliphatic, alicyclic, or aromatic radicals.

Preferably, $R^1$ is an aromatic organic radical and, more preferably, a radical of the formula (II):

wherein each of $A^1$ and $A^2$ is a monocyclic divalent aryl radical and $Y^1$ is a bridging radical having one or two atoms which separate $A^1$ from $A^2$. In an exemplary embodiment, one atom separates $A^1$ from $A^2$. Illustrative non-limiting examples of radicals of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene, or isopropylidene.

The polycarbonates are produced by the interfacial reaction of dihydroxy compounds with a carbonyl halide, wherein only one atom separates $A^1$ and $A^2$ of the dihydroxy compound. As used herein, the term "dihydroxy compound"

includes, for example, bisphenol compounds having general formula (III) as follows:

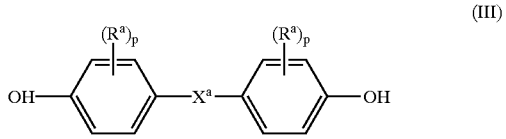

(III)

wherein $R^a$ and $R^b$ each represent a monovalent hydrocarbon group and may be the same or different; p and q are each independently integers from 0 to 4; and $X^a$ represents one of the groups of formula (IV):

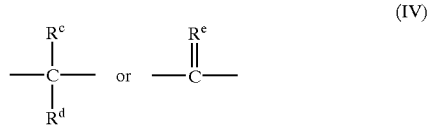

(IV)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the dihydroxy-substituted aromatic hydrocarbons disclosed by name or formula (generic or specific) in U.S. Pat. No. 4,217,438. A nonexclusive list of specific examples of the types of bisphenol compounds that may be represented by formula (III) includes the following: 1,1-bis(4-hydroxyphenyl) methane; 1,1-bis(4-hydroxyphenyl) ethane; 2,2-bis(4-hydroxyphenyl)propane (hereinafter "bisphenol A" or "BPA"); 2,2-bis(4-hydroxyphenyl)butane; 2,2-bis(4-hydroxyphenyl)octane; 1,1-bis(4-hydroxyphenyl)propane; 1,1-bis(4-bromophenyl) propane, 1,1-bis(tetrabromophenyl)propane, and other brominated 1,1-bis(phenyl)propanes; 1,1-bis(4-hydroxyphenyl) n-butane; bis(4-hydroxyphenyl)phenylmethane; 2,2-bis(4-hydroxy-1-methylphenyl)propane; 1,1-bis(4-hydroxy-t-butylphenyl)propane; bis(hydroxyaryl)alkanes such as 2,2-bis(4-hydroxy-phenyl)propane; 1,1-bis(4-hydroxyphenyl) cyclopentane; and bis(hydroxyaryl)cycloalkanes such as 1,1-bis(4-hydroxyphenyl)cyclohexane.

It is also possible to employ two or more different dihydric phenols or a copolymer of a dihydric phenol with a glycol or with a hydroxy- or acid-terminated polyester or with a diacid chloride, a dibasic acid (e.g., dodecanedioc acid) or hydroxy acid in the event a carbonate copolymer rather than a homopolymer is desired for use. Polyarylates and polyester-carbonate resins or their blends can also be employed. Branched polycarbonates are also useful, as well as blends of linear polycarbonate and branched polycarbonate. The branched polycarbonates may be prepared by adding a branching agent during polymerization.

These branching agents may comprise polyfunctional organic compounds containing at least three functional groups, which may be hydroxyl, carboxyl, carboxylic anhydride, and compositions comprising at least one of the foregoing. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethyl benzyl) phenol, trimesic acid and benzophenone tetracarboxylic acid. The branching agents may be added at a level of about 0.05–2.0 weight percent based on the total weight of the composition. Branching agents and procedures for making branched polycarbonates are described in U.S. Pat. Nos. 3,635,895 and 4,001,184. All types of polycarbonate end groups are contemplated as being included.

Preferred polycarbonates are based on bisphenol A, in which each of $A^1$ and $A^2$ is p-phenylene and $Y^1$ is isopropylidene. Preferably, the polycarbonate has an average molecular weight of less than or equal to about 100,000, with less than or equal to about 65,000 preferred, and less than or equal to about 35,000 more preferred. Also preferred is a polycarbonate with an average molecular weight of greater than or equal to about 5,000, with greater than or equal to about 10,000 more preferred, and greater than or equal to 15,000 especially desired. Furthermore, the polycarbonate has a melt viscosity index (MVI), in $cm^3$ per 10 minutes, of less than or equal to about 30, with less than or equal to about 20 preferred, and less than or equal to about 15 more preferred. Also preferred is a melt viscosity index of greater than or equal to about 4, with greater than or equal to about 6 more preferred, and greater than or equal to 10 especially desired. Preferred endcapping agents are phenol, p-tert-butylphenol, p-cumylphenol, octylphenol, nonylphenol and other endcapping agents.

Phosgene is the most preferred carbonyl halide, but other carbonyl halides may be substituted for phosgene. Suitable carbonyl halides include, but are not limited to, carbonyl chlorides, carbonyl bromide, carbonyl iodide, carbonyl fluoride and compositions comprising at least one of the foregoing. Other carbonyl chlorides including diphosgene and triphosgene are also suitable. The carbonyl halide may be introduced into the reaction system in the form of a gas or a liquid, or it may be dissolved in any feed stream except the caustic feed stream before the introduction of the feed stream into the reaction system.

Suitable organic solvents for use in the interfacial polycarbonate synthesis include any organic solvent that is substantially insoluble in water and inert to the process conditions. The organic solvent should also be a liquid under the reaction conditions and should not react with the carbonyl halide, or the caustic. Suitable organic solvents which can be used in the interfacial reaction are for example, aliphatic hydrocarbons, such as hexane and heptane; chlorinated aliphatic hydrocarbons, such as methylene chloride, chloroform, carbon tetrachloride, dichloroethane, trichloroethane, tetrachloroethane, dichloropropane and 1,2-dichloroethylene; aromatic hydrocarbons, such as benzene, toluene and xylene; substituted aromatic hydrocarbons such as, chlorobenzene, dichlorobenzene, the various chlorotoluenes, nitrobenzene, and acetophenone; and carbon disulfide. The chlorinated aliphatic hydrocarbons, especially methylene chloride, are preferred.

The polycarbonate synthesis may be conducted in the presence of a catalyst, for example a tertiary amine and/or a phase transfer catalyst, such as a tetraalkylammonium salt. Suitable tertiary amine catalysts include, but are not limited to triethylamine, tripropylamine, and tributylamine. Phase transfer catalysts include but are not limited to tetrabutylammonium bromide and methyl tributylammonium bromide. The amine catalyst may be included in an amount, based on the amount of dihydroxy compound, of less than or equal to about 2 mole percent, with less than or equal to about 1.5 preferred. Also preferred is an amount of amine catalyst, based on the amount of dihydroxy compound, of greater than or equal to about 0.25, with greater than or equal to about 1 more preferred. The phase transfer catalyst may be in the range of less than or equal to about 2 mole percent based on the dihydroxy compound. The catalyst mixture may be charged to the reactor prior to addition of the carbonyl halide addition or may be programmed into the batch reactor during addition of the carbonyl halide.

The control scheme is predicated on the premise that aqueous alkali or alkaline earth metal hydroxide (for convenience, "caustic") is used to maintain the pH of the phosgenation mixture near the pH set point. The phosgenation mixture can have a pH of less than or equal to about 11.5, with less than or equal to about 11.0 preferred. Also preferred is a mixture pH of greater than or equal to about 3.0, with greater than or equal to about 9.5 more preferred, and greater than or equal to 10 especially desired. Some of the alkali metal or alkaline earth metal hydroxides, which can be employed, are for example, sodium hydroxide, potassium hydroxide, and calcium hydroxide. Sodium and potassium hydroxides, and particularly sodium hydroxide are preferred, especially those having concentrations of at least about 5 M.

The amount of caustic required to maintain the pH of the reaction in the desired range generally increases as the reaction progresses. Without being bound by theory, this is likely due to an increase in the direct reaction of the caustic with the carbonyl halide as the quantity of dihydroxy compound available for reaction decreases. For reactions where carbonyl halide is fed into a reactor containing the dihydroxy compound, maintaining the desired pH range therefore requires controlling the relative ratio of caustic to carbonyl halide as the reaction progresses. It has been unexpectedly discovered by the inventors hereof that by further controlling the actual ratios to within certain specified ranges over the course of the reaction, reproducible pH profiles of the reactions over time can be obtained. It has still further been discovered that by monitoring the change in pH over the course of the reaction, and correlating this change with the ratio of caustic to carbonyl halide fed into the reaction, characteristic traces are obtained, which allow the batch endpoint of the reaction to be readily determined without periodic sampling of the reaction.

A summary of process variables, control modes, and controlled variables is set forth in Table 1 below:

TABLE 1

| Process Variable Sensed or Calculated | Control Mode | Controlled Variable |
|---|---|---|
| PH | Feedback | pH set point, pH upper and lower constraints |
| Caustic flow rate | Feed forward | Caustic flow set point, upper and lower caustic flow constraints |
| Carbonyl halide flow rate | Feed forward | Carbonyl halide flow set point, upper and lower carbonyl halide flow constraints |
| Ratio | Feedback | Ratio set point, upper and lower ratio constraints |
| Total carbonyl halide | Feedback | Segmentation, carbonyl halide flow rate |
| Total caustic | Feedback | Caustic flow rate |
| Time | Feedback | Timing set points, timing upper and lower constraints |

Specific control system devices include, without limitation, mass flow meters, flow control valves, pH measurement systems, and pumps. The various transducers used to measure variables that characterize the process and the various signals generated thereby may take a variety of forms or formats. For example, the control elements may be implemented using electrical analog, digital electronic, pneumatic, hydraulic, mechanical, or other similar types of equipment or compositions comprising at least one of the foregoing. Control may be executed manually, or preferably by a controller such as a computer, the system being interconnected to form a single entity by a communication system. The computer controller is preferably a microprocessor controller, which is associated with a display device (e.g., a CRT screen) and input/output device (e.g., a keyboard). The microprocessor controller may be located at the reactor or at a remote location (such as the control room of a plant). The controller may control one or a plurality of reactors at a single or a plurality of sites. Signal lines are used to represent the results of calculations carried out in a digital computer and the term signal is utilized to refer to such results. Thus the term signal is used not only to refer to electrical currents or pneumatic pressures but it is also used to refer to binary representations of a calculated or measured value. The apparatus and methods described herein can accordingly be implemented using a wide variety of specific equipment available to and understood by those of ordinary skill in the process art.

Referring now to FIG. 1, a schematic flow diagram 10 of the apparatus and improved interfacial polycarbonate reaction control scheme is shown, wherein the reactant flow rates, ratio set points, pH set points, and their upper and lower constraints are changed or maintained according to a predetermined scheme. As shown in FIG. 1, first feed conduit 12 allows for the flow of a carbonyl halide, e.g., phosgene, from source 14 through flow control valve 16, which is operably associated with conduit 12. The carbonyl halide flow is initially set at a rate corresponding to a predetermined flow set point. The flow of carbonyl halide is monitored by flow meter 18 en route to reactor 20. A signal corresponding to the measurement by flow meter 18 is transmitted to a controller/analyzer, e.g., computer 22, which allows computer 22 to determine the quantity of carbonyl halide added to reactor 20. Computer 22 may also be used to determine the total quantity of carbonyl halide added to the reaction.

A second feed conduit 24 allows for the flow of caustic from caustic source 26 through flow control valve 28, which is operably associated with conduit 24. The caustic flow is also initially set at a rate corresponding to a predetermined flow set point. The flow of caustic is monitored by flow meter 30 en route to reactor 20. A signal corresponding to the measurement by flow meter 30 is transmitted to computer 22, which allows computer 22 to determine the quantity of caustic added to reactor 20, including the total quantity.

The pH of the reactor process is continuously measured, using for example pH meter 32, and a signal corresponding to the pH measurement is transmitted to computer 22 for comparison to a predetermined set point.

At the start of the reaction process, a set ratio between caustic and carbonyl halide is determined and initiated. A convenient ratio may be measured and expressed as the molar ratio of the caustic flow rate to the carbonyl flow rate. Other ratios may also be used. As the pH of the reactor process is continuously measured, a signal corresponding to the pH measurement is transmitted to computer 22 and compared with a predetermined pH set point. The difference between the measured pH and the predetermined pH set point is used to adjust the ratio of caustic flow rate to carbonyl halide flow rate. Preferably, the ratio is adjusted by adjusting the flow rate of caustic. Upper and lower limits for the target ratio are predetermined, and the reaction conditions are controlled so as to maintain the ratio within these limits.

Notably, these upper and lower limits, or constraints, are not constant over the course of the reaction, but change depending on the total amount of carbonyl halide charged to the reactor. Accordingly, after a predetermined percent of the required total amount of carbonyl halide is charged to the reactor, the ratio of caustic flow rate to carbonyl flow rate is maintained within a second set of constraints. Preferably, the course of the reaction is divided into two, three, or four, or even five segments, wherein the upper and lower ratio limits are individually optimized for each segment.

Determining initial reactant quantities, caustic to carbonyl halide ratios, ratio constraints, pH set points, pH constraints, number of segments, segment timing, and segment timing constraints will depend on the reactants, the size of the reaction, temperature, catalyst, solvent, required purity, molecular weight of the product, and similar parameters. Such determinations may be made by routine experimentation by those of ordinary skill in the art. An exemplary three-step reaction segmentation and ratio constraints are shown in Table 2 below. All values in Table 2 are used by way of explanation and, therefore, should not be viewed as limiting.

TABLE 2

| Percent of Total Required Amount of Carbonyl Halide Fed to Reactor | | Ratio of Caustic to Phosgene Flow Rates | | |
| --- | --- | --- | --- | --- |
| From | To | Lower Limit | Target | Upper Limit |
| 0 | 65 ±5 | −5% to 15% | 2.0 | +5% to 15% |
| 65 ±5 | 85 −5, +10 | −1% to 5% | 2.0 | +1 to 5% |
| 85 ±5, +10 | 100 | −5% to 15% | 2.0 | +25 to 100% |

Figure 2:
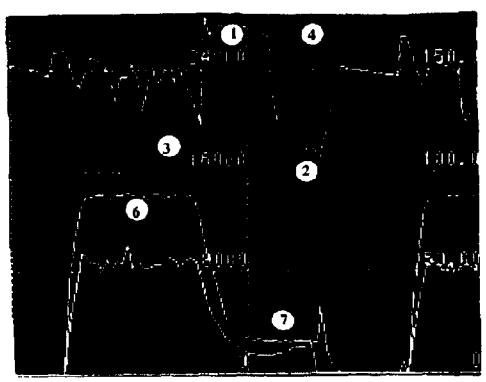
FIG. 2 is a trace of characteristic pH and caustic to carbonyl halide ratio over time showing batch completion.

It has unexpectedly been found that appropriate selection of a ratio and in particular ratio constraints, and other parameters results in reproducible traces of pH and ratio over time. Carbonyl halide flow rate and caustic flow rate may also be monitored over time. Both the pH and ratio traces have characteristic trends that indicate batch completion. An exemplary trace is shown in FIG. 2, wherein it is shown that the pH trace is characterized by a region of pH fluctuation, followed by a hump (indicated by the numeral 1) at about 90% phosgenation. At about 94% phosgenation, the pH decreases (indicated by the numeral 2) and levels out at about 9.0. A characteristic ratio trace exhibits steadiness as indicated by the numeral 3, followed by a sharp increase (indicated by the numeral 4). Real time monitoring of these traces can accordingly provide a method for determining batch completion without the need for periodic sampling and analysis.

An exemplary embodiment is accordingly a two (or more) segment process, wherein the reaction is divided into at least two, and preferably three segments. Up to five segments may also be used. Transition from one segment to another ("timing") is most conveniently based on the amount of reactant, preferably carbonyl halide, charged to the reactor. For each segment, caustic input (as reflected by flow rate, e.g.) relative to carbonyl halide input (as reflected by flow rate, e.g.) to the reactor is controlled ("ratio control"). For each segment, a target ratio value is determined, as well as constraints on the upper and lower limits of the target value. At least two segments have different target ratios and/or constraints. As the reaction progresses, the ratio can be reset depending upon pH measurements of the reaction solution. The degree of reset is based upon the relative difference between the actual pH measurement and a pH set point. However, even if additional pH reset is desired, this control system will not violate the predetermined upper and lower ratio limits.

The pH set points can also be altered for each segment, and preferably are also constrained by upper and lower limits. The timing set points can also be altered for each segment, and preferably are also constrained by upper and lower limits. A unique and reproducible pH trace is obtained by manipulation of each of, ratio, ratio constraints, pH set points, pH constraints, timing set points and timing constraints. Once the repeatable and reproducible trace has been developed, its data can then be used to determine batch completion.

Figure 3:
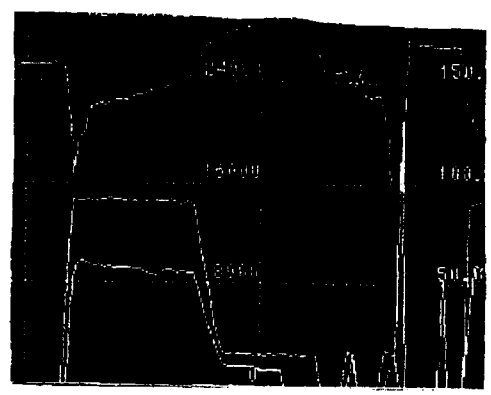
FIG. 3 is a trace of pH and caustic to carbonyl halide ratio over time suitable for diagnostic purposes.

The pH and ratio traces also aid in monitoring, and thus troubleshooting and adjusting of the reaction parameters. A method for monitoring an interfacial polycarbonate synthesis thus comprises determining a characteristic pH trace over time and ratio of caustic to carbonyl halide trace over time for the reaction; obtaining a pH trace over time and ratio of caustic to carbonyl halide trace over time for the reaction to be monitored; diagnosing status and conditions of the reactor process based on the traces; and executing maintenance of the reactor process based, at least in part, on the diagnosis. As shown in FIG. 3, for example, the steady increase in pH during the early stages of the reaction indicate that the reaction is not proceeding ideally. Reaction parameters to be adjusted include but are not limited to the "controlled variables" listed in Table 1.

In one specific embodiment hereof, a method for controlling the manufacture of polycarbonate comprises charging a reactor with carbonyl halide at a carbonyl halide flow rate corresponding to a carbonyl halide flow rate set point, wherein the reactor contains a dihydroxy compound, solvent, and optionally catalyst and endcapping agent; charging the reactor with caustic at a caustic flow rate, wherein the caustic flow rate is determined by a ratio between caustic and carbonyl halide set point; measuring pH of reactor process; comparing the measured pH to a pH set point having upper and lower constraints; calculating any difference between the measured pH and the pH set point; selecting the ratio within a first set of constraints based upon any difference to provide in a second ratio; manipulating one of a caustic flow rate or a carbonyl halide flow rate to match the second ratio; selecting the ratio within a second set of constraints based upon any pH difference to provide in a third ratio after a predetermined percentage of the total amount of carbonyl halide has been charged to the reactor; manipulating one of the caustic flow rate or the carbonyl halide flow rate to match the third ratio; producing a pH trace of the reaction over time; and producing a ratio trace of the reaction over time.

In another embodiment, a method for monitoring an interfacial reaction between a dihydroxy compound and a carbonyl halide comprises determining a characteristic pH trace over time and ratio between caustic and carbonyl halide trace over time for the reaction; obtaining a pH trace over time and ratio of caustic to carbonyl halide trace over time for the reaction to be monitored; diagnosing status and conditions of the reaction based on the traces; and executing maintenance of the reactor process based, at least in part, on the diagnosis.

The method will produce an improved polycarbonate product that is more pure than previously attainable, due to the minimization of residual dihydroxy compound present in the final polycarbonate product. The amount of residual dihydroxy compound is minimized by greater reaction completion. Also minimized is the amount of residual chloride compound found in the polycarbonate product. Residual chloride compounds originate from the excessive use of phosgene. Since the method minimizes the amount of phosgene needed, the amount of residual chloride compound is also reduced. In one embodiment, the polycarbonate is greater than 98%, preferably greater than 99%, and more preferably greater than 99.5% pure.

The above described control and monitoring system for interfacial polycarbonate reactions provides a comprehensive scheme for monitoring and controlling a variety of input and output parameters as well as a plurality of operational parameters resulting in a greater efficiency. The control scheme results in additional batch production due to the gain in time that manual batch testing of each and every batch has been eliminated. The amount of raw materials used is reduced by the elimination of adding excess reactant to bring the reaction to completion and the elimination of sampling of each and every batch. Batch consistency is increased by each batch being made to approximately the same completion point. Also reduced are the molding cycle times. High quality polycarbonates and polycarbonate compositions can be manufactured having the desired molecular weights, as well as very low levels of residual dihydroxy starting material, e.g., less than about 100 parts per million.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for controlling the manufacture of polycarbonate, comprising:
    charging a reactor with carbonyl halide at a carbonyl halide flow rate corresponding to a carbonyl halide flow rate set point, wherein the reactor contains a dihydroxy compound, solvent, and optionally catalyst and endcapping agent;
    charging the reactor with caustic at a caustic flow rate, wherein the caustic flow rate is determined by a ratio between caustic and carbonyl halide set point;
    measuring pH of reactor process;
    comparing the measured pH to a pH set point having upper and lower constraints;
    calculating any difference between the measured pH and the pH set point;
    selecting the ratio within a first set of constraints based upon any difference to provide in a second ratio;
    manipulating one of a caustic flow rate or carbonyl halide flow rate to match the second ratio;
    selecting the second ratio within a second set of constraints based upon any pH difference to provide in a third ratio after a predetermined percentage of the total amount of carbonyl halide has been charged to the reactor;
    manipulating one of the caustic flow rate or the carbonyl halide flow rate to match the third ratio;
    producing a pH trace of the reaction over time; and
    producing a ratio trace of the reaction over time.

2. The method of claim 1, further comprising determining a characteristic pH and ratio traces of the reaction.

3. The method of claim 2, further comprising using the characteristic pH and ratio traces to determine completion of additional reactions.

4. The method of claim 1, wherein the dihydroxy compound is a bisphenol, and the carbonyl halide is phosgene.

5. The method of claim 1, wherein the dihydroxy compound is a bisphenol compound having the general formula (III):

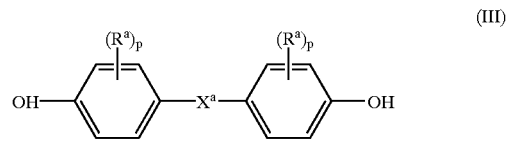

(III)

wherein $R^a$ and $R^b$ each represent a monovalent hydrocarbon group; p and q are each independently integers from 0 to 4; and $X^a$ represents a group of formula (IV):

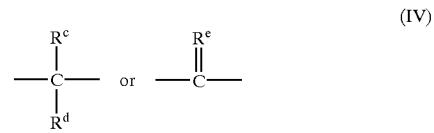

(IV)

wherein $R^c$ and $R^d$ is a hydrogen atom, a monovalent linear group, or a cyclic hydrocarbon group; and $R^e$ is a divalent hydrocarbon group.

6. The compound of claim 5, wherein the bisphenol is bisphenol A.

7. A method for monitoring an interfacial reaction between a dihydroxy compound and a carbonyl halide comprising:
    determining a characteristic pH trace over time and ratio between caustic and carbonyl halide trace over time for the reaction;
    obtaining a pH trace over time and ratio of caustic to carbonyl halide trace over time for the reaction to be monitored;
    diagnosing status and conditions of the reaction based on the pH trace and the halide trace; and
    executing maintenance of reactor process based, at least in part, on the diagnosis.

8. The method of claim 7, wherein the dihydroxy compound is a bisphenol, and the carbonyl halide is phosgene.

9. The method of claim 7, wherein the dihydroxy compound is a bisphenol compound having the general formula (III):

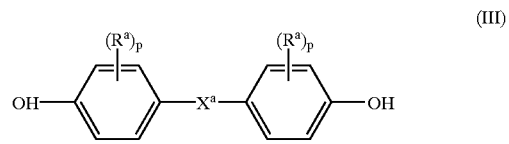

(III)

wherein $R^a$ and $R^b$ each represent a monovalent hydrocarbon group; p and q are each independently integers from 0 to 4; and $X^a$ represents a group of formula (IV):

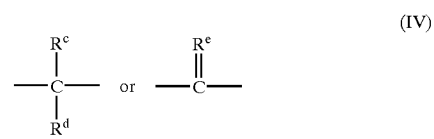

(IV)

wherein $R^c$ and $R^d$ is a hydrogen atom, a monovalent linear group, or a cyclic hydrocarbon group; and $R^e$ is a divalent hydrocarbon group.

10. The compound of claim 9, wherein the bisphenol is bisphenol A.

11. The method of claim 7, wherein executing maintenance comprises adjusting one or more of pH set point, pH constraints, caustic flow set point, caustic flow constraints, carbonyl halide flow set point, carbonyl halide flow constraints, ratio set point, ratio constraints, reaction segmentation, carbonyl halide flow rate, caustic flow rate, timing set points, and timing constraints.

12. The method of claim 7, wherein executing maintenance is ending the reaction.

13. A method for identifying an end point of an interfacial reaction between a dihydroxy compound and a carbonyl halide, comprising:

determining the characteristic end point of reaction from a characteristic pH trace over time or ratio between caustic and carbonyl halide trace over time for the reaction;

obtaining a pH trace over time or ratio between caustic and carbonyl halide trace over time during the reaction to be monitored; and identifying the end point of the monitored reaction when an obtained pH or ratio trace resembles the end point determined from the characteristic pH or ratio trace.

14. The method of claim 13, wherein the dihydroxy compound is a bisphenol, and the carbonyl halide is phosgene.

15. The method of claim 13, wherein the dihydroxy compound is a bisphenol compound having the general formula (III):

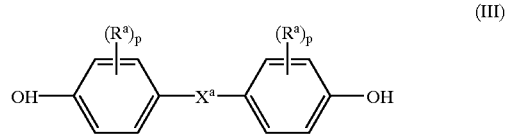

(III)

wherein $R^a$ and $R^b$ each represent a monovalent hydrocarbon group; p and q are each independently integers from 0 to 4; and $X^a$ represents a group of formula (IV):

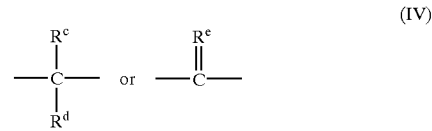

(IV)

wherein $R^c$ and $R^d$ is a hydrogen atom, a monovalent linear group, or a cyclic hydrocarbon group; and $R^e$ is a divalent hydrocarbon group.

16. The compound of claim 15, wherein the bisphenol is bisphenol A.

* * * * *